March 24, 1936.    W. HOLM    2,035,162
FEED GEAR
Filed Oct. 4, 1934
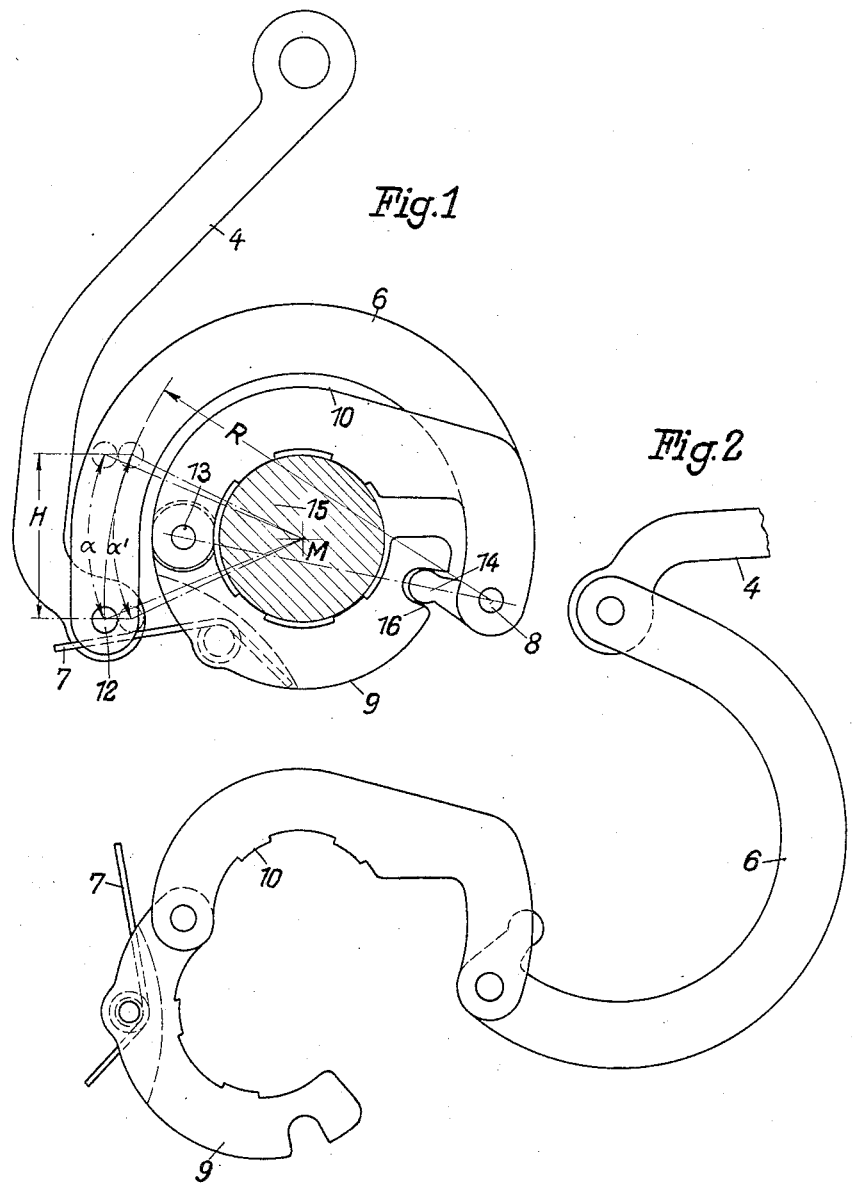

Patented Mar. 24, 1936

2,035,162

UNITED STATES PATENT OFFICE 2,035,162

FEED GEAR

Waldemar Holm, Furstenwalde-on-the-Spree, Germany, assignor to N. V. Machinerieen-en Apparaten Fabrieken, "Meaf", Utrecht, Netherlands Application October 4, 1934, Serial No. 746,909
In Germany April 26, 1934

1 Claim. (Cl. 74—164)

This invention relates to a clamping feed gear for driving gas meter counters and transforming the reciprocating motion of the measuring member into a rotary motion of the counter shaft.

The invention more specifically has for its object the provision of a friction drive which makes it possible to compensate for variations of the gas meter characteristic, which occur in time as the result of wear or the like, and which cause the meter to give too low an indication for the gas consumed.

With the usual meters it is possible that the indication will be too low and not accurate in time because of the natural wear of the parts which transmit the diaphragm movement. Too low an indication for the amount of gas consumed may also be caused under certain circumstances by the moisture in some kinds of gas, which moisture, in time, causes an enlargement of the diaphragm.

In known clamping feed gears a pair of clamping jaws are disposed on a drum on the counter shaft which jaws are hinged together on one end. The jaws are drawn together by a lever hinged to one of them and engaging with a projecting tooth in a recess of the other jaw. To the other end of this lever a draw bar is connected, the end of which is attached to the to and fro going end of an oscillating lever driven by the diaphragm of the gas meter.

According to this invention the lever by means of which the jaws are drawn together has the shape of a bow surrounding the drum on the counter shaft to such an extent that the center of this shaft lies inside the area within the bow shaped lever and the line connecting its articulation points with the draw bar and the one of the jaws. By suitable selection of the articulation points the transmission of the diaphragm movement to the meter mechanism is so influenced that the meter indication, which otherwise in time would be too low and inaccurate, always corresponds exactly with the actual amount of gas consumed.

By way of example, the invention is illustrated in the accompanying drawing in which Figures 1 and 2 are diagrammatic views of the gear according to the invention.

Referring to the drawing, the drum 15 on the counter shaft is embraced by two clamping jaws 9 and 10 which are hinged at 13. At the other end of the jaw 10 a bow 6 is articulated at 8 and, on the other side, articulated to the driving rod 4. Between the bow 6 and the jaw 9 a spring 7 is interposed for keeping the parts under the necessary tension. Near the fulcrum 8 the bow 6 has an attached tooth 14 which engages a corresponding recess 16 in the jaw 9. As will be seen from the drawing the bow 6 surrounds the drum 15 to such an extent that its center M lies inside the area within the bow 6 and the line connecting its articulation points 8 and 12.

Any wear of the drum 15 and of the jaws 9 and 10 respectively will cause the jaws to close more tightly round the drum 15, bringing the tooth 14 in a more upright position. The consequence is that the bow 6 turns on its fulcrum point 8 and that its articulation point 12 moves on a circular line with the radius R round point 8. As this circular line lies inside the circle round M with a radius equal to the distance between M and the articulation point 12, this point 12 thereby comes nearer to the drum 15.

As will be seen from the drawing this dislocation of the point 12 towards the drum 15 upon increased wear of the gear brings with it that, while the stroke H of this point is maintained, an increased angular displacement $\alpha'$ is imparted to the drum 15 instead of the angular displacement $\alpha$ prevailing as long as the drum 15 and the jaws 9 and 10 show no wear.

What is claimed is:

A clamping feed gear for driving gas meter counters comprising a counter shaft, a drum thereon, two hinged clamping jaws embracing the drum on the counter shaft, one of said jaws having a recess, a bow shaped lever hinged to the other jaw, a projecting tooth on this bowl shaped lever engaging the recess in the one jaw, a draw bar connected to the other end of the bow shaped lever, said bow shaped lever embracing the drum to such an extent that the center of the drum lies inside the area within the bow shaped lever and the line connecting its articulation points.

WALDEMAR HOLM.